Patented May 18, 1937

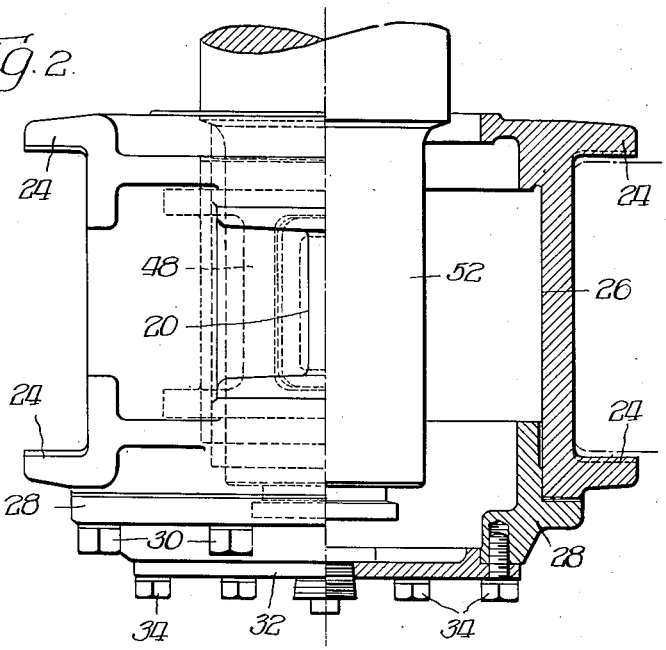
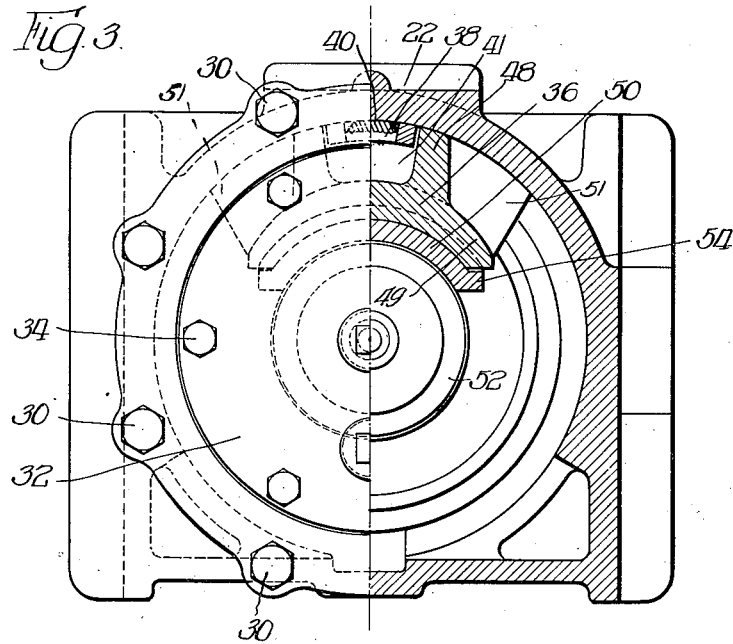

2,080,738

UNITED STATES PATENT OFFICE 2,080,738

WHEEL AND AXLE ASSEMBLY

Alfred H. Oelkers, Chicago, Ill., assignor to American Steel Foundries, Chicago, Ill., a corporation of New Jersey Application March 11, 1933, Serial No. 660,362

12 Claims. (Cl. 308—40)

This invention relates to improvements in wheel and axle assemblies for railway car trucks and to the method of reconstructing present designs of wheel and axle assemblies to convert such assemblies to the improved arrangement disclosed herein.

Railway car trucks have been equipped with roller bearings through which the load of the car body and truck is transmitted to the car axles from the journal boxes of the truck through the roller bearings. This method of installing roller bearings has been known as the "journal box application" and is used extensively in railway trucks for passenger cars and locomotive tenders. In such trucks the general truck design is the same as when friction journal boxes are used but in order to obtain sufficient space for roller bearings of ample capacity, the journal boxes have been made larger and the trucks have been equipped with pedestals having wider openings between the jaws for receiving the larger journal boxes.

In another design for wheel and axle assemblies for car trucks which has certain improved advantages, the roller bearings are installed within the wheel and axle assembly and the journal ends of the inner stationary axle are made to about the same dimensions as the journals for frictional bearing axles.

It is an object of the present invention to provide a construction for railway car trucks in which the roller bearing units are installed within the wheel and axle assemblies and the journal ends of the inner stationary axles are made to fit into the larger journal boxes previously designed for receiving roller bearings, the construction including a special adapter which takes the place of the roller bearing and supports the journal box upon the journal end of the stationary axle.

It is also an object of the present invention to disclose a method by which the journal box type of roller bearing installations may be converted to the wheel and axle bearing type in order that such change may be economically carried out by the railroads that wish to so improve their trucks without the cost of installing new journal boxes.

With these and various other objects in view the invention may consist of certain novel features of construction and operation as will be more fully described and particularly pointed out in the specification, drawings and claims appended hereto.

In the drawings:

Figure 2 is a plan view of the journal box, a portion thereof being shown in section, and Figure 3 is an end elevation of the journal box, a portion thereof being shown in section.

Figure 1:
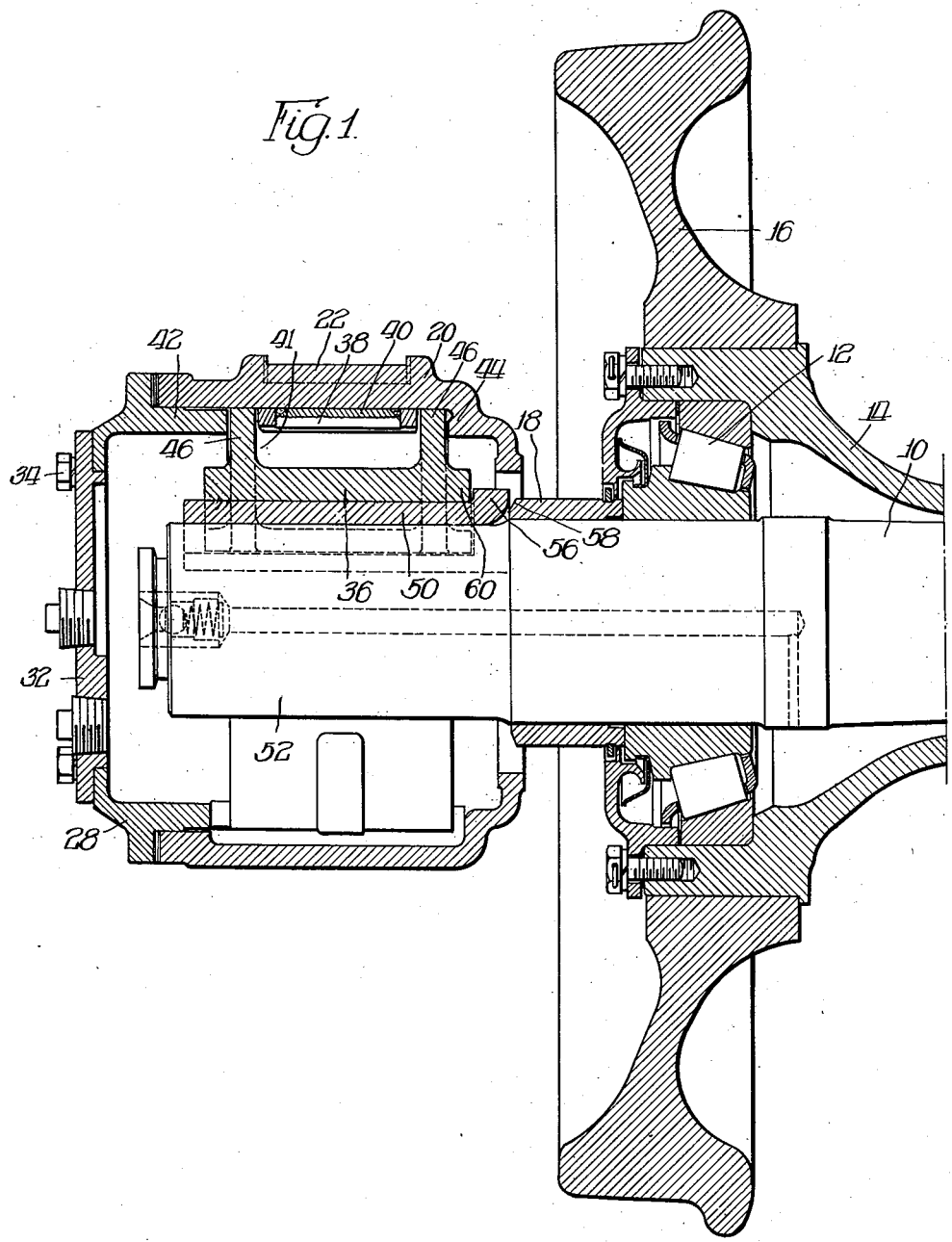
Figure 1 is a section taken through a journal box of a wheel and axle assembly through the center line of the axle.

The stationary axle 10 has mounted thereon a roller bearing unit 12 through which the rotatable axle housing 14 is supported on its ends. The wheel 16 is carried by the axle housing 14 and the wheel and axle assembly is held in operative position by the shrink collar 18 mounted on the axle 10. The journal box 20 is provided with equalizer seats 22 on the top of which the weight of the car body is carried, and is further provided with pedestal jaws 24 which engage the pedestals of the car truck frame.

When this type of journal box is used with roller bearings carrying the load on the journal axle, then such bearings are installed within the bore 26 of the journal box and such bearings are usually held in adjustment by the removable end 28 of the journal box which is fastened by screw bolts 30. The removable end member 28 may also be provided with a cover 32 fastened by screw bolts 34.

According to the present invention an adapter 36 is provided to take the place of the roller bearing unit and is proportioned to fit into the bore 26 of the journal box and to receive the weight which is transmitted through the equalizer seats 22. In order to hold the adapter against shifting movement in the journal box a loop-shaped key 38 is welded as at 40 on to the top surface of the internal bore 26 of the journal box. The adapter has a recessed opening 41 adapted to loosely receive the key 38. Thus the adapter 36 is free to shift laterally into abutment against the stop flange 42 on the end member 28 or into abutment with the shoulder 44 formed at the inner end of the journal box. Lateral thrusts of the axle are therefore not transmitted against the key 38. The key 38 merely holds the adapter against rotation with respect to the journal box. The recessed opening 41 in the upper side of the adapter is defined by transverse walls 46 and longitudinal walls 48, the walls 46 extending laterally of the walls 48 to provide wings 51 which, together with the walls, are in bearing engagement against the bore 26 of the journal box.

The vertical load of the car is transmitted through the adapter which has an arcuate shaped body portion 49 integral with the walls 46 and 48 and which cooperates with a journal bearer 50 onto the journal end 52 of the axle 10, the wings

51 extending to the edges of said body portion to distribute this load over the entire area of said body portion. The journal bearer 50 has shoulders 54 which prevent rotation of the bearer with respect to the adapter 36 and the bearer is further provided at its inner end with a shoulder 56 adapted to abut against the outer end 58 of the shrink collar 18 and adapted to transmit the lateral thrust to the inner end 60 of the adapter 36. Thus lateral forces tending to shift the axle lengthwise within the journal box are transmitted from the end of shrink collar 18 to the end of the journal bearer 50, which transmits the thrust to the adapter 36, which in turn transmits the lateral force against the stop flange 42 of the journal box end 28. The lateral forces are therefore finally transmitted to the body of the journal box through the pedestal jaws 24 to the car truck frame.

It is to be appreciated that according to the method of the present invention in order to convert the journal box type of roller bearing installation to the improved type, it is unnecessary to install new journal boxes since the roller bearings may be replaced by the special adapters and the improved wheel and axle assembly used in place of the previous rotatable wheeled axle. The steps include removing the wheel and axle assembly and the roller bearing units from the journal boxes, welding the loop-shaped keys to the interior of the journal boxes and assembling the improved wheel and axle assemblies with the journal boxes by employing the special adapters and journal bearers through which the journal boxes are supported on the relatively stationary axles.

It is to be understood that I do not wish to be limited by the exact embodiment of the device shown, which is merely by way of illustration and not limitation, as various other forms of the device will of course be apparent to those skilled in the art without departing from the spirit of the invention as ascertained from the scope of the appended claims.

I claim:

1. In a wheel and axle assembly for car trucks, an axle, a journal box adapted to receive an end of said axle, a loop-shaped key welded to the top portion of said journal box on the inner side thereof, an adapter through which the load is transmitted from said journal box to said axle, said adapter having a recess adapted to receive said key whereby said adapter is loosely positioned by said key.

2. An interchangeable journal box construction comprising a journal box provided with a wall having a continuous arcuate and imperforate surface adapted to normally cooperate with the race ring of a roller bearing disposed in said journal box, a key secured to said wall in abutting relation with said surface upon removal of said roller bearing and depending therefrom, and an adapter disposed within said journal box for cooperative relation with an axle extending into said journal box, said adapter engaging said key to prevent rotation thereof with respect to said axle.

3. An interchangeable journal box construction comprising a journal box provided with a wall having an imperforate surface adapted to normally cooperate with the race ring of a roller bearing disposed in said journal box, a key secured to said wall in abutting relation with said surface upon removal of said roller bearing and depending therefrom, and an adapter disposed within said journal box for cooperative relation with an axle extending into said journal box, said adapter cooperating with said surface and embracing said key, whereby the same is prevented from rotating with respect to said axle.

4. An interchangeable journal box construction comprising a journal box provided with a wall having a continuous arcuate and imperforate surface adapted to normally cooperate with the race ring of a roller bearing disposed in said journal box, a key secured to said wall in abutting relation with said surface upon removal of said roller bearing and depending therefrom, and an adapter having an arcuate surface cooperating with said first-named arcuate surface and being formed to have cooperative relation with an axle extending into said journal box, said adapter engaging said key to prevent rotation thereof with respect to said axle.

5. An interchangeable journal box construction comprising a journal box provided with a wall having a continuous arcuate and imperforate surface adapted to normally cooperate with the race ring of a roller bearing disposed in said journal box, a key secured to said wall in abutting relation with said surface upon removal of said roller bearing and depending therefrom, and an adapter having an arcuate surface cooperating with said first-named arcuate surface and being formed to have cooperative relation with an axle extending into said journal box, said last-named surface being provided on a portion of said adapter embracing said key whereby the same is prevented from rotating with respect to said axle.

6. An interchangeable journal box construction comprising a journal box provided with a wall having an imperforate surface adapted to normally cooperate with the race ring of a roller bearing disposed in said journal box, a key secured to said wall in abutting relation with said surface upon removal of said roller bearing and depending therefrom, an adapter disposed within said journal box for cooperative relation with an axle extending into said journal box, said adapter having a recess embracing said key to prevent rotation thereof with respect to said axle, and a journal bearer frictionally cooperating with said adapter, said adapter and journal bearer having cooperating shoulders preventing rotation of said bearer with respect to said adapter.

7. An interchangeable journal box construction comprising a journal box provided with a wall having an imperforate surface adapted to normally cooperate with the race ring of a roller bearing disposed in said journal box, a key secured to said wall in abutting relation with said surface upon removal of said roller bearing and depending therefrom, an adapter disposed within said journal box for cooperative relation with an axle extending into said journal box, said adapter having a recess embracing said key to prevent rotation thereof with respect to said axle, and a journal bearer frictionally cooperating with said adapter, said adapter and journal bearer having cooperating shoulders preventing rotation of said bearer with respect to said adapter, said bearer having a flange engageable with the end of said adapter for transfer of lateral thrust therebetween.

8. An interchangeable journal box construction comprising a journal box provided with a wall having a continuous arcuate and imperforate surface adapted to normally cooperate with the race ring of a roller bearing disposed in said journal box, a key secured to said wall in abutting relation with said surface upon removal of said roller bearing and depending therefrom, an adapter having an arcuate surface cooperating with said first-named arcuate surface and being formed to have cooperative relation with an axle extending into said journal box, said last-named surface being provided on a portion of said adapter formed with a recess embracing said key whereby the same is prevented from rotating with respect to said axle, and a journal bearer frictionally cooperating with said adapter, said adapter and journal bearer having cooperating shoulders preventing rotation of said bearer with respect to said adapter.

9. An interchangeable journal box construction comprising a journal box provided with a wall having a continuous arcuate and imperforate surface adapted to normally cooperate with the race ring of a roller bearing disposed in said journal box, a key secured to said wall in abutting relation with said surface upon removal of said roller bearing and depending therefrom, an adapter having an arcuate surface cooperating with said first-named arcuate surface and being formed to have cooperative relation with an axle extending into said journal box, said last-named surface being provided on a portion of said adapter formed with a recess embracing said key whereby the same is prevented from rotating with respect to said axle, and a journal bearer frictionally cooperating with said adapter, said adapter and journal bearer having cooperating shoulders preventing rotation of said bearer with respect to said adapter, said bearer having a flange engageable with the end of said adapter for transfer of lateral thrust therebetween.

10. An adapter for converting roller bearing journal boxes into plain bearing journal boxes, comprising an arcuate shaped body portion having upstanding walls extending therefrom and forming a recess therebetween.

11. An adapter for converting roller bearing journal boxes into plain bearing journal boxes, comprising an arcuate shaped body portion having upstanding walls extending therefrom and forming a recess therebetween and wing portions extending laterally of certain of said walls.

12. An adapter for converting roller bearing journal boxes into plain bearing journal boxes, comprising an arcuate shaped body portion having upstanding walls extending therefrom and forming a recess therebetween and wing portions integral with said body portion and extending laterally of certain of said walls, the surface defining the edges of said walls and wings being concentric with the inside surface of said body portion.

ALFRED H. OELKERS.